(12) United States Patent
Kobayashi et al.

(10) Patent No.: US 11,408,970 B2
(45) Date of Patent: Aug. 9, 2022

(54) POSITION DETECTION SYSTEM

(71) Applicant: Rohm Co., Ltd., Kyoto (JP)

(72) Inventors: Tadashi Kobayashi, Kyoto (JP); Atsushi Momota, Kyoto (JP); Tengai Kubo, Kyoto (JP); Hideki Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/972,855

(22) PCT Filed: May 21, 2019

(86) PCT No.: PCT/JP2019/020061
§ 371 (c)(1),
(2) Date: Dec. 7, 2020

(87) PCT Pub. No.: WO2019/244543
PCT Pub. Date: Dec. 26, 2019

(65) Prior Publication Data
US 2021/0247482 A1 Aug. 12, 2021

(30) Foreign Application Priority Data
Jun. 22, 2018 (JP) .............................. JP2018-118683

(51) Int. Cl.
*G01S 5/14* (2006.01)
(52) U.S. Cl.
CPC ...................... *G01S 5/14* (2013.01)
(58) Field of Classification Search
CPC ................................... G01S 5/14; G01S 19/48
USPC ....................................................... 342/385
See application file for complete search history.

(56) References Cited

U.S. PATENT DOCUMENTS

| 2007/0073481 A1* | 3/2007 | Morgan ............... G01C 25/005 701/500 |
| 2009/0247186 A1 | 10/2009 | Ji et al. |
| 2013/0093627 A1* | 4/2013 | Cosman .................. G01S 19/34 342/451 |
| 2017/0124592 A1 | 5/2017 | Naya |

(Continued)

FOREIGN PATENT DOCUMENTS

| CN | 108885107 A * | 11/2018 | ............. G01C 21/16 |
| EP | 3508882 A1 * | 7/2019 | ........... A61B 5/1113 |

(Continued)

OTHER PUBLICATIONS

Japan Patent Office, International Search Report for PCT/JP2019/020061 dated Aug. 20, 2019 with English translation.

*Primary Examiner* — Harry K Liu
(74) *Attorney, Agent, or Firm* — Fish & Richardson P.C.

(57) ABSTRACT

This position detection system comprises a mobile station that transmits a beacon signal, a plurality of fixed stations that receive the beacon signal, and a position analysis device that acquires position information for the mobile station by estimating the position of the mobile station from the reception intensities of the beacon signal at each fixed station. The mobile station includes a movement detection unit (acceleration sensor, geomagnetic sensor, etc.) that determines when movement has stopped. While the movement of the mobile station has stopped, the position analysis device stops estimating the position of the mobile station and keeps the position information at a fixed position.

12 Claims, 7 Drawing Sheets

(56) References Cited

U.S. PATENT DOCUMENTS

2017/0228811 A1\* 8/2017 Moreau .............. G06Q 30/0224
2021/0337355 A1\* 10/2021 Sobol ...................... H04W 4/80

FOREIGN PATENT DOCUMENTS

| JP | 2000-050345 A | 2/2000 | | |
|----|---------------|--------|----|----|
| JP | 2011-117943 A | 6/2011 | | |
| JP | 2013-148486 A | 8/2013 | | |
| JP | 2015-220678 A | 12/2015 | | |
| JP | 2016-217943 A | 12/2016 | | |
| JP | 2017-138116 A | 8/2017 | | |
| JP | 2017-156195 A | 9/2017 | | |
| JP | 2018-036165 A | 3/2018 | | |
| WO | WO-2005062066 A2 \* | 7/2005 | ............ | G01S 5/021 |
| WO | 2015/178402 | 11/2015 | | |

\* cited by examiner

POSITION DETECTION SYSTEM

TECHNICAL FIELD

The present disclosure relates to a position detection system.

BACKGROUND ART

Figure 5:
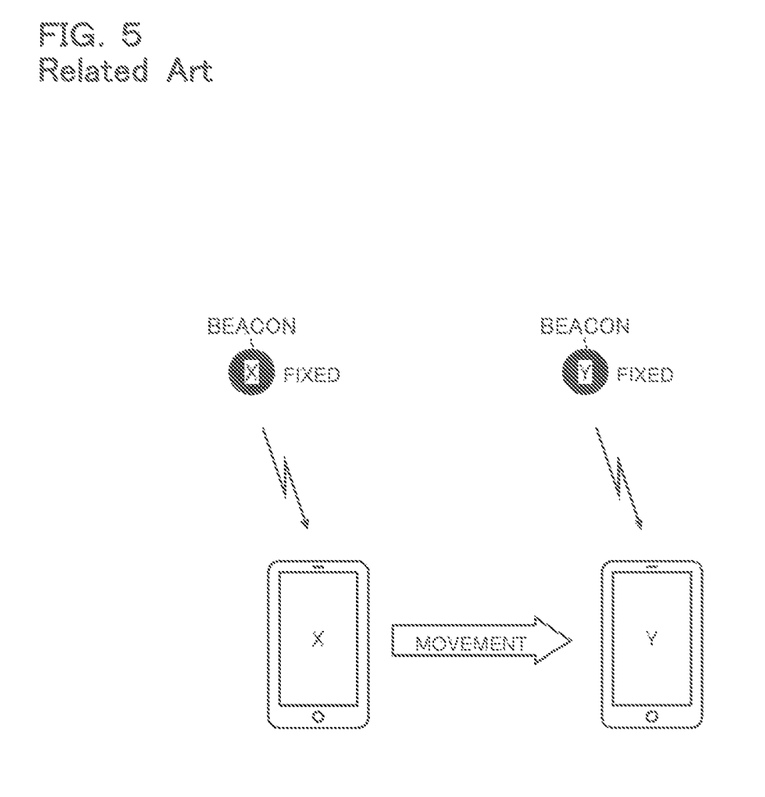
FIG. 5 is a diagram showing a first application example of indoor position detecting technology using a beacon.

Recent years have seen example after example of application of indoor position detection technology using beacons. For example, iBeacon (registered trademark) is one example of application of indoor positioning technology employing a BLE (Bluetooth [registered trademark] low-energy) communication capability of smartphones (iPhones [registered trademark]). With this technology (FIG. 5), which is already in practical use, when signals transmitted from beacons installed in front of stores are detected by a smartphone of a person passing by them, the person is push-notified of coupons X and Y of those stores.

On the other hand, in offices and factories, not only is information acquired with smartphones, but also beacons are carried around by workers to monitor their position information and to improve work efficiency. For example, in a known system (FIG. 6), beacon receivers (i.e., access points) are installed at fixed places in an office or a factory, and when a person carrying a beacon comes close to any of the access points, the presence of the person near it is recognized. In particular indoors, where signals of a GPS (global positioning system) do not reach, beacons are considered to be an effective means for detecting absolute positions.

Examples of known technology related to what has been mentioned above are seen in Patent Documents 1 and 2 identified below.

CITATION LIST

Patent Literature

Patent Document 1: Japanese unexamined patent application publication No. 2017-156195
Patent Document 2: Japanese unexamined patent application publication No. 2018-36165

SUMMARY

Technical Problem

Figure 6:
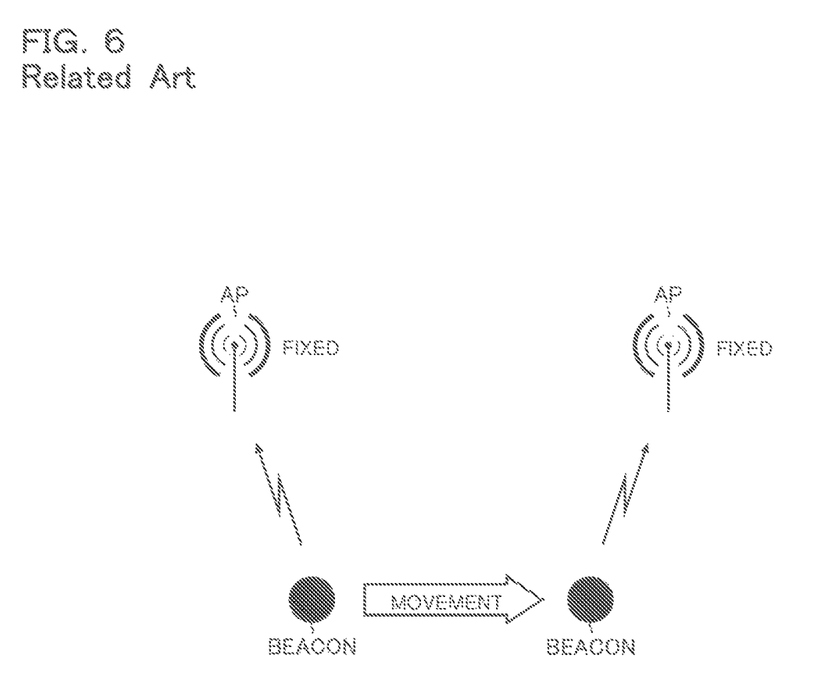
FIG. 6 is a diagram showing a second application example of indoor position detecting technology using a beacon.

In general, the system shown in FIG. 6 employs a technology like this: a plurality of access points are installed within a given space so that a signal transmitted from one beacon is detected by more than one access point, and a server that controls the plurality of access points analyzes the reception strength of the beacon signal at each access point and thereby estimates the position of the beacon (by three-point measurement, triangulation, or the like).

It is however known that, with that technology, while it is possible to identify the approximate position of a beacon, it is difficult to achieve position detection with such accuracy as attained with a GPS because of variation of reception strength as well as signal attenuation and variation due to presence of obstacles.

Figure 7:
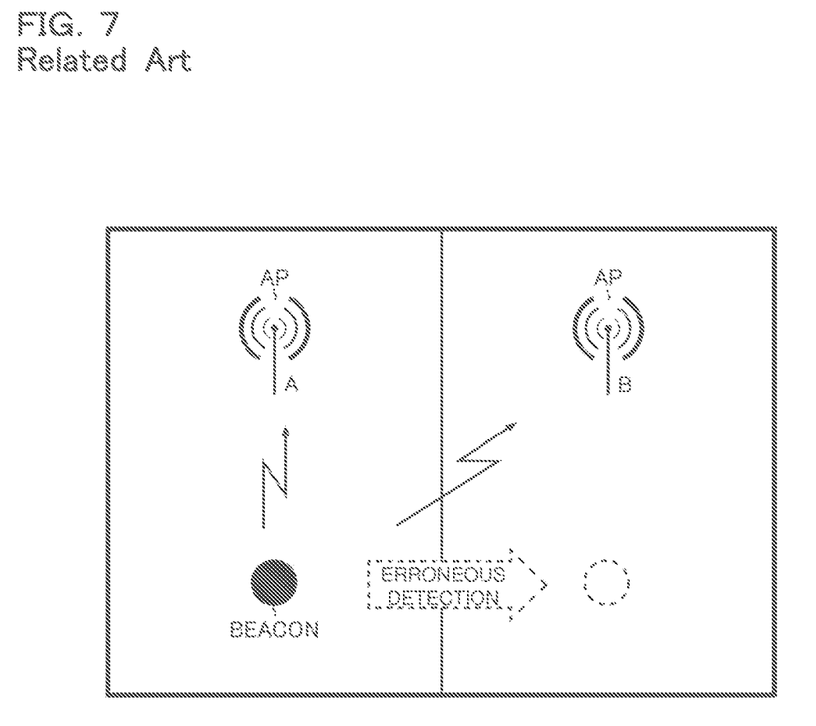
FIG. 7 is a diagram showing how a position can be erroneously detected.

For example, in a situation as shown in FIG. 7, when the signal transmitted from the beacon is detected by both access points A and B and in addition the strength of the signal received at access point B is higher than the strength of the signal received at access point A, the beacon may be erroneously recognized as being present not inside the room where access point A is installed but inside the room where access point B is installed.

In view of the above-mentioned problems encountered by the present inventors, an object of the present disclosure is to provide a position detection system that achieves higher accuracy.

Solution to Problem

According to one aspect of what is disclosed herein, a position detection system includes: a mobile station configured to transmit a beacon signal; a plurality of fixed stations configured to receive the beacon signal; a position analyzing device configured to perform position estimation on the mobile station based on the reception strength of the beacon signal at each of the fixed stations, thereby to acquire position information on the mobile station. The mobile station includes a movement sensor configured to perform quiescence determination. The position analyzing device is configured, while the mobile station is stationary, to suspend the position estimation on the mobile station and retain the position information at a fixed position. (A first configuration.)

In the position detection system of the first configuration described above, preferably, the position analyzing device is configured, after suspending the position estimation on the mobile station, to measure the reception strength of the beacon signal at each of the fixed stations a plurality of times, and to determine the fixed position based on the results of the measurement. (A second configuration.)

In the position detection system of the second configuration described above, preferably, the position analyzing device is configured to identify, among the plurality of fixed stations, the fixed station at which the reception strength of the beacon signal is highest most frequently, to determine the fixed position based on a result of the identifying. (A third configuration.)

In the position detection system of the second configuration described above, preferably, the position analyzing device is configured to identify, among the plurality of fixed stations, the fixed station at which the average reception strength of the beacon signal is highest, to determine the fixed position based on a result of the identifying. (A fourth configuration.)

In the position detection system of any of the first to fourth configurations described above, preferably, the movement sensor includes an acceleration sensor configured to sense acceleration. (A fifth configuration.)

In the position detection system of any of the first to fifth configurations described above, preferably, the movement sensor includes a geomagnetism sensor configured to sense geomagnetism. (A sixth configuration.)

In the position detection system of the fifth configuration described above, preferably, the mobile station is configured to derive regularly the number of steps of a person carrying the mobile station based on a sensing signal obtained from the acceleration sensor, to perform the quiescence determination based on how the number of steps is updated. (A seventh configuration.)

In the position detection system of the fifth or sixth configuration described above, preferably, the mobile station is configured to perform the quiescence determination by using at least one of a raw value, an average value, and a variance value of a sensing signal obtained from the movement sensor. (An eighth configuration.)

In the position detection system of the fifth configuration described above, preferably, the mobile station is configured to perform frequency analysis on a sensing signal obtained from the acceleration sensor, to perform the quiescence determination based on a result of the analysis. (A ninth configuration.)

In the position detection system of any of the first to ninth configurations described above, preferably, the mobile station transmits, along with the beacon signal, the result of the quiescence determination. (A tenth configuration.)

In the position detection system of any of the first to tenth configurations described above, preferably, the plurality of fixed stations are installed at different places indoors. (An eleventh configuration.)

According to another aspect of what is disclosed herein, a position analyzing device is configured, when a mobile station configured to transmit a beacon signal is not stationary, to perform position estimation on the mobile station based on the reception strength of the beacon signal at a plurality of fixed stations to acquire position information on the mobile station and, when the mobile station is stationary, to suspend the position estimation on the mobile station and retain the position information at a fixed position. (A twelfth configuration.)

According to yet another aspect of what is disclosed herein, a mobile station includes a movement sensor configured to perform quiescence determination, and is configured to transmit, along with a beacon signal, the result of the quiescence determination. (A thirteenth configuration.)

According to the present disclosure, it is possible to provide a position detection system that achieves higher accuracy.

DESCRIPTION OF EMBODIMENTS

<Position Detection System>

Figure 1:
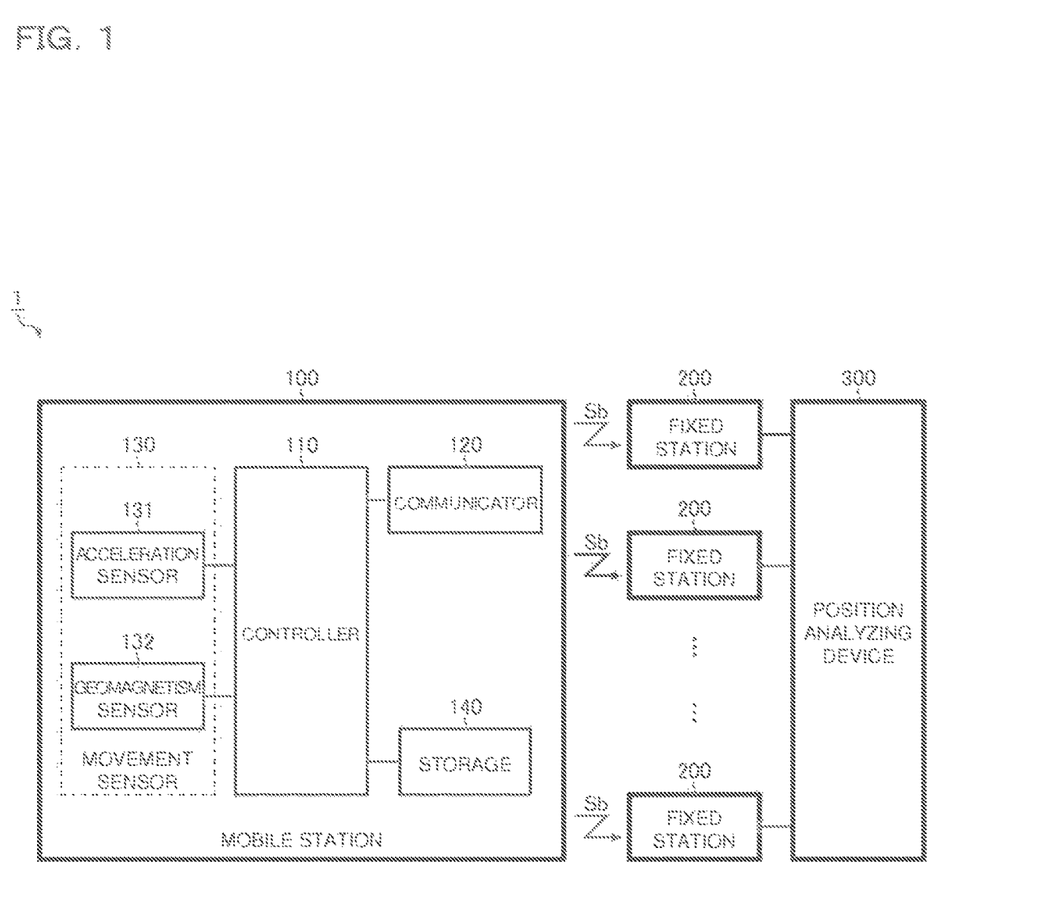
FIG. 1 is a diagram showing an overall configuration of a position detection system.

FIG. 1 is a diagram showing an overall configuration of a position detection system. The position detection system 1 of this configuration example is a kind of indoor positioning system that is used to monitor the position of a human or an object that moves indoors (inside an office, a factory, a store, or the like). The position detection system 1 includes a mobile station 100, a plurality of fixed stations 200, and a position analyzing device 300.

The mobile station 100 is a wireless communication terminal (what is called a beacon) that transmits a beacon signal Sb periodically, at a predetermined interval period T (e.g., T=1 s). The mobile station 100 includes a controller 110, a communicator 120, a movement sensor 130, and a storage 140. Usable as the mobile station 100 is, for example, an information processing terminal (e.g., a smartphone) that is carried by a person who is the target of monitoring, or any other wearable device (such as a smartwatch or a business card with a communication capability). The mobile station 100 can be in the form of an IC tag that is attached to a shopping cart used inside a store, or an article of merchandise.

The controller 110 is the principal agent that comprehensively controls the operation of the mobile station 100, and can be suitably implemented with a CPU (central processing unit). The controller 110 is provided with a function of performing quiescence (motionlessness, inactivity) determination (which will be described in detail later) on the mobile station 100 based on various sensing signals obtained from the movement sensor 130.

The communicator 120 broadcasts a beacon signal Sb in compliance with a predetermined near-field communication standard (e.g., BLE) according to instructions from the controller 110. The beacon signal Sb contains ID information for distinguishing the mobile station 100 (or its carrier). The mobile station 100 (in particular the communicator 120) transmits, together with the beacon signal Sb, a quiescence determination flag STB (corresponding to a result of quiescence determination on the mobile station 100), and the technical significance of this will be described in detail later.

The movement sensor 130 is a sensing means by which the controller 110 performs quiescence determination on the mobile station 100. The movement sensor 130 incudes, for example, an acceleration sensor 131 for sensing acceleration and a geomagnetism sensor 132 for sensing geomagnetism. The acceleration sensor 131 and the geomagnetism sensor 132 can each be implemented with a sensor of either a two-axis detection type (x-axis and y-axis) or a three-axis detection type (x-axis, y-axis, and z-axis).

The storage 140 is used as an storage area for control programs that are executed by the controller 110, and also as a temporary storage area for sensing values obtained in the movement sensor 130.

The plurality of fixed stations 200 are each an access point (or a gateway) that receives the beacon signal Sb broadcast from the mobile station 100, and are installed at different places indoors. A fixed station 200 that has received the beacon signal Sb adds ID information on itself, position information on itself, and the reception strength of the beacon signal Sb (what is called an RSSI [received signal strength indicator]) to the information contained in the beacon signal Sb (i.e., ID information on the mobile station 100, a quiescence determination flag STB, etc.), and then delivers the result to the position analyzing device 300.

Based on the reception strength of the beacon signal Sb at each fixed station 200, the position analyzing device 300 performs position estimation on the mobile station 100 and thereby acquires position information on the mobile station 100. As the position analyzing device 300, it is possible to use a local server or a cloud server.

With the position detection system of this configuration example, for example, by making a monitoring target carry the mobile station 100, it is possible to acquire position information on the monitoring target and perform movement track analysis and the like on it even indoors, where GPS signals do not reach. The operation of each of the mobile station 100 and the position analyzing device 300 will be described in detail below.

<Mobile Station (Beacon)>

Figure 2:
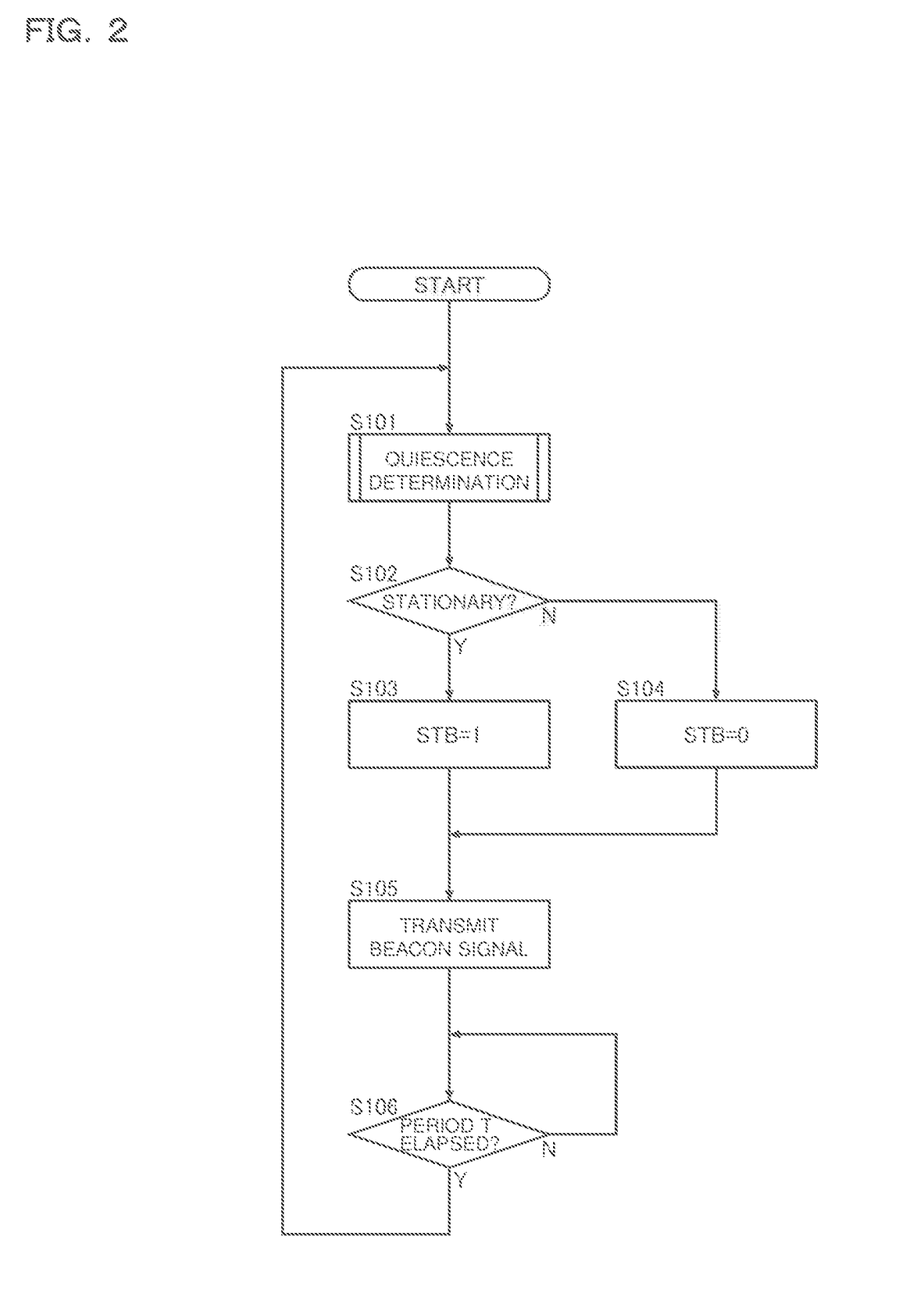
FIG. 2 is a flow chart showing an example of operation of a mobile station.

FIG. 2 is a flow chart showing an example of the operation of the mobile station 100. First, at Step S101, a quiescence determination process on the mobile station 100 is performed (a process for determining whether the mobile station 100 is stationary is performed). The quiescence determination process at this step will be described in detail later.

Here, if the mobile station 100 is determined to be stationary (if Step S1 results in a Y (yes) determination), the operation flow proceeds to Step S103, where the quiescence determination flag STB is turned to "1" (i.e., the logic value indicating quiescence).

By contrast, if the mobile station 100 is determined not to be stationary (if Step S1 results in an N (no) determination), the operation flow proceeds to Step S104, where the quiescence determination flag STB is turned to "0" (i.e., the logic value indicating non-quiescence).

Subsequently, at Step S105, the beacon signal Sb (together with the quiescence determination flag STB) is broadcast.

Thereafter, at Step S106, whether a predetermined interval period T has elapsed is checked. Here, if the interval period T is judged to have elapsed (S106 resulting in Y), the operation flow returns to Step S101, where the sequence of operation described above is repeated. By contrast, if the interval period T is judged not to have elapsed (S106 resulting in N), the operation flow returns to Step S106, where the interval period T is waited for to elapse.

<Position Analyzing Device (Server)>

Figure 3:
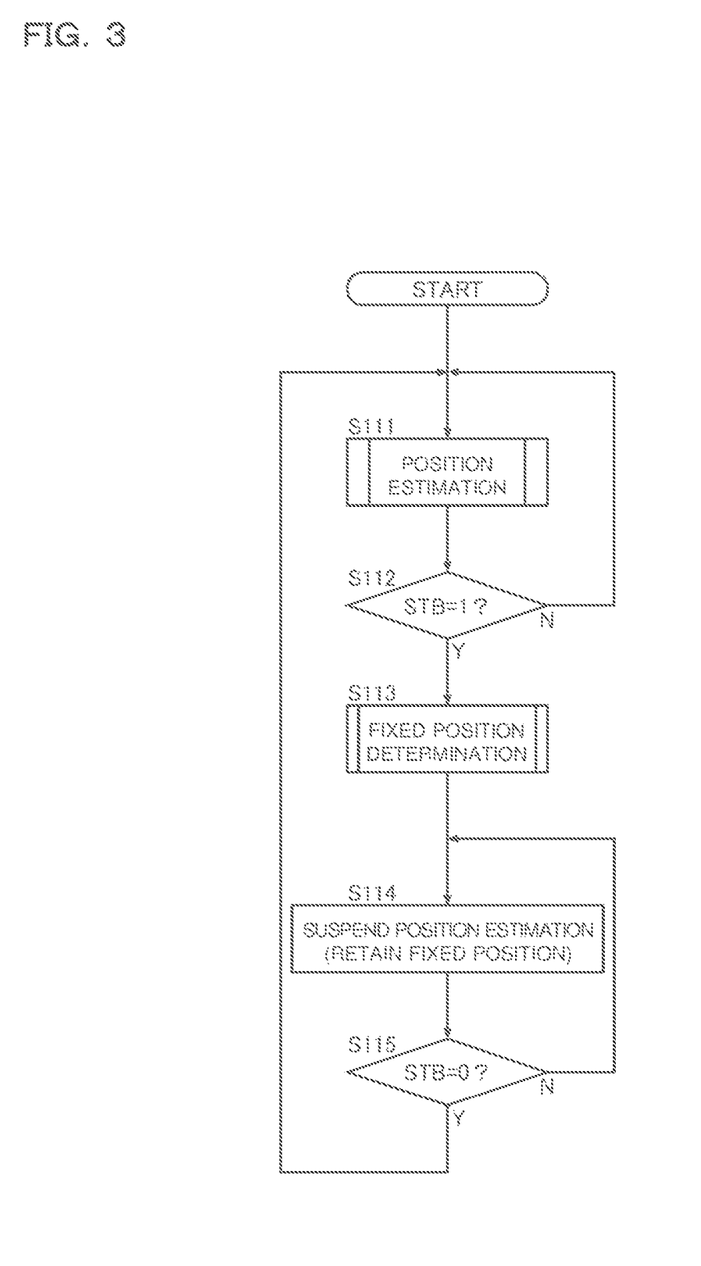
FIG. 3 is a flow chart showing an example of operation of a position analyzing device.

FIG. 3 is a flow chart showing an example of the operation of the position analyzing device 300. First, at Step S111, based on the reception strength of the beacon signal Sb at each fixed station 200, the distance from each fixed station 200 to the mobile station 100 (i.e., the proximity between the two) is calculated and a position estimation process on the mobile station 100 (by three-point measurement, triangulation, or the like) is performed.

Next, at Step S112, whether the quiescence determination flag STB is "1" is checked, that is, whether the mobile station 100 is stationary is determined. Here, if the quiescence determination flag STB is judged to be "1" (S112 resulting in Y), the operation flow proceeds to Step S113. By contrast, if the quiescence determination flag STB is judged not to be "1" (S112 resulting in N), the operation flow returns to Step S111, where the position estimation process on the mobile station 100 is continued.

As described above, in the position detection system 1 of this configuration example, the mobile station 100 performs a quiescence determination process on itself, and the result of the determination (i.e., the quiescence determination flag STB) is transmitted to the position analyzing device 300. Thus, simply by referring to the logic value of the quiescence determination flag STB, it is possible to know whether the mobile station 100 is stationary.

Theoretically, it is also possible to transmit, instead of the quiescence determination flag STB, a sensing value obtained from the movement sensor 130 (a raw value, an average value, or a variance value, or a value resulting from any of those values being compressed by a predetermined algorithm) to the position analyzing device 300 so that the position analyzing device 300 performs a quiescence determination process on the mobile station 100 (see Step S101 in FIG. 2). However, in view of the electric power consumption and the communication bandwidth required for transmission of the sensing values as they are, such a configuration has to be considered impractical.

If Step S112 results in a Yes determination, then at Step S113, a fixed position determination process on the mobile station 100 is performed. The fixed position determination process at this step will be described in detail later.

Subsequently, at Step S114, the position estimation process on the mobile station 100 is suspended, and position information on the mobile station 100 is retained at a fixed position. That is, the mobile station 100 is regarded as being stationary at the fixed position determined at Step S113.

Thereafter, at Step S115, whether the quiescence determination flag is "0" is checked, that is, whether the mobile station 100 is back in motion is determined. Here, if the quiescence determination flag is judged to be "0" (S115 resulting in Y), the operation flow returns to Step S111, where the position estimation process on the mobile station 100 is resumed. By contrast, if the quiescence determination flag is judged not to be "0" (S115 resulting in N), the operation flow returns to Step S114, where position estimation suspension and fixed position retention on the mobile station 100 are continued.

As described above, while the mobile station 100 stays stationary, the position analyzing device 300 suspends position estimation on the mobile station 100 and retains position information on the mobile station 100 at a fixed position. That is, while the mobile station 100 stays stationary, even if the reception strength of the beacon signal Sb at each fixed station 200 is unstable, the position information on the mobile station 100 does not exhibit unnecessary variation. It is thus possible to enhance the accuracy of position detection on the mobile station 100.

<Quiescence Determination Process>

Next, the quiescence determination process on the mobile station 100 (Step S101 in FIG. 2) will be described in detail.

First, a first quiescence determination method conceivable is a determination method employing a pedometer capability of the acceleration sensor 131. Specifically, in this method, the number of steps of the person carrying the mobile station 100 is derived regularly based on the sensing signals obtained from the acceleration sensor 131, and as the number of steps is updated, whether the mobile station 100 is stationary is determined.

For example, when the number of steps is not incremented for a predetermined quiescence determination period (or when it is not incremented to reach a predetermined threshold value in that period), the mobile station 100 (and its carrier) can be determined to be stationary.

The first quiescence determination method is one of the simplest determination methods, and is easy to implement in the mobile station 100. However, if the carrier of the mobile station 100 shuffles around or the mobile station 100 is attached to a shopping cart, that is, in a situation where the number of steps cannot be detected correctly, it is difficult to properly determine whether the mobile station 100 is stationary.

Next, a second quiescence determination method conceivable is a method of determining whether the mobile station 100 is stationary based on at least one of a raw value, an average value, or a variance value of a sensing signal obtained from the movement sensor 130.

For example, every time N sensing values from each of the acceleration sensor 131 and the geomagnetism sensor 132 are logged, the variance values with respect to the respective axes (e.g., the variance values of acceleration along the x, y, and z axes and of geomagnetism along the x, y, and z axes), and if those values are equal to or less than a predetermined threshold value, the mobile station 100 (and its carrier) can be determined to be stationary.

Calculating an average value or a variance value of a sensing signal requires retaining, for sensing values from each of the acceleration sensor 131 and the geomagnetism sensor 132, not only the current output value but also previous output values. To that end, as a temporary storage area for sensing values, the storage 140 can be used, or a register or the like (not illustrated) in the controller 110 can be used.

The second quiescence determination method allows stricter quiescence determination on the mobile station 100 than the first quiescence determination method.

The threshold values with which to compare the variance values with respect to the respective axes can be determined, for example, by multiplying the variance values prescribed in the specifications of each of the acceleration sensor 131 and the geomagnetism sensor 132 (i.e., the minimum variance values ascribable to noise) by a predetermined coefficient. Setting the threshold values in that way permits application-to-application adjustment of the threshold values used in the quiescence determination process. Needless to say, using a low-noise acceleration sensor 131 and a low-noise geomagnetism sensor 132 helps carry out an accurate quiescence determination process.

The criterion for quiescence determination on the mobile station 100 can be set as desired. For example, quiescence can be recognized when the variance values with respect to all the axes are equal to or less than the threshold voltage, or when the variance values with respect to a majority of the axes are equal to or less than the threshold voltage. The criterion for quiescence determination can be further relaxed so that quiescence is recognized when the variance value with respect to even one axis is equal to or less than the threshold voltage.

In particular, the reference voltage generation circuit 130 includes not only the acceleration sensor 131 but also the geomagnetism sensor 132. When geomagnetism is measured indoors, a slight variation in the position of geomagnetism measurement (i.e., the position of the mobile station 100) causes a notable variation in the sensing value of geomagnetism due to differences in the measurement environment (i.e., differences in the degree of magnetization of reinforcing steel, differences in the material of wall surfaces, and the like). Therefore, introducing a geomagnetism sensor 132 as one element of the reference voltage generation circuit 130 makes it possible to perform a quiescence determination process by exploiting the environment-dependence of geomagnetism indoors.

However, at a place known as where the external magnetic field varies significantly (e.g., near a motor), the geomagnetism sensor 132 can not perform the quiescence determination process properly. In such a case, the quiescence determination process can be performed based only on sensing values from the acceleration sensor 131.

A third quiescence determination method conceivable is a method of performing frequency analysis on the sensing signal obtained from the acceleration sensor 131 and determining whether the mobile station 100 is stationary based on the result of the analysis.

When the carrier of the mobile station 100 is moving (walking or driving) in a horizontal direction, the sensing signal obtained from the acceleration sensor 131 varies periodically. Accordingly, performing frequency analysis on the sensing signal obtained from the acceleration sensor 131 results in finding a peak in a particular frequency component (several Hertz). By contrast, when the carrier of the mobile station 100 is not moving in the horizontal direction (e.g., when the person is seated and is working at a desk or when the person is standing still and is doing stretching exercises), the sensing signal from the acceleration sensor 131 varies irregularly in contrast to during walking or driving. Accordingly, performing frequency analysis on the sensing signal from the acceleration sensor 131 does not result in finding peak in a particular frequency component. Thus, based on the difference just mentioned, it is possible to determine whether the mobile station 100 is stationary.

While the description above deals with examples where the first to third quiescence determination methods are each implemented individually, these can be implemented in any combination in a quiescence determination process on the mobile station 100. Any other quiescence determination method can be employed.

<Fixed Position Determination Process>

Figure 4:
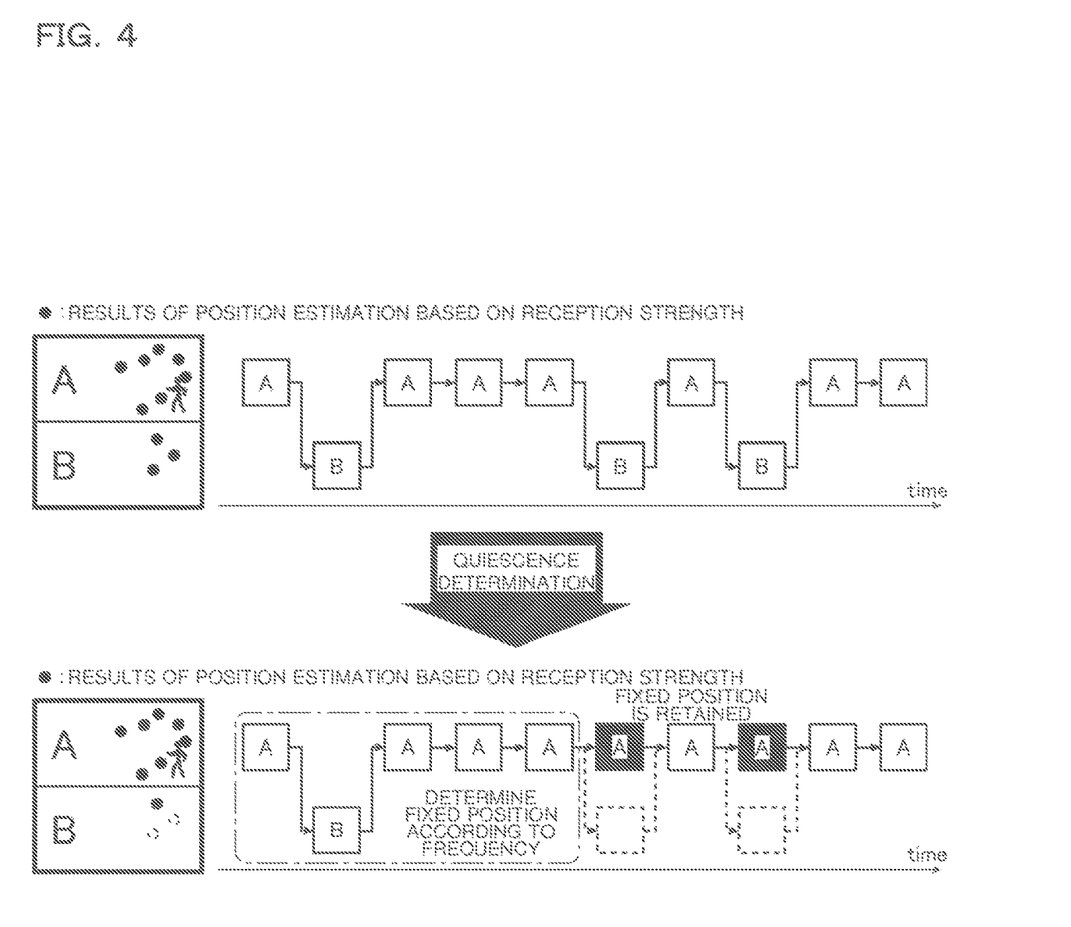
FIG. 4 is a diagram showing one example of a fixed position determination process.

Next, the fixed position determination process on the mobile station 100 (i.e., Step S113 in FIG. 3) will be described specifically with reference to FIG. 4. FIG. 4 is a diagram showing one example of the fixed position determination process.

In a situation where the beacon signal Sb is being received by both access points A and B, if, for the sake of discussion, the position estimation process based on the reception strength of the beacon signal Sb (Step S111 in FIG. 3) is continued, as illustrated in the top tier of FIG. 4, the position information on the mobile station 100 exhibits unnecessary variations because of variation of reception strength as well as signal attenuation and variation due to presence of obstacles. Specifically, erroneous detection can occasionally occur, like the mobile station 100, despite being present inside the room where access point A is installed, being detected to be present inside the room where access point B is installed.

On the other hand, the lower tier of FIG. 4 shows how, in response to quiescence determination on the mobile station 100, the fixed position determination process (indicated by a frame of a dash-and-dot line) is performed on the mobile station 100 and then position information on the mobile station 100 is retained at a fixed position (in FIG. 4, fixed position "A").

The fixed position determination process on the mobile station 100 can proceed, for example, as follows. Based on a result of detecting the mobile station 100 being stationary, position estimation on the mobile station 100 based on reception strength is suspended, and then the reception strength of the beacon signal Sb at each fixed station 200 (in FIG. 4, access points A and B) is measured a plurality of times; then based on the results of the measurement, the fixed position of the mobile station 100 can be determined.

For example, the position analyzing device 300 can identify, among the plurality of fixed stations 200, the fixed station at which the reception strength of the beacon signal Sb is the highest most frequently (that is, the fixed station nearest to the mobile station 100), and based on the result of the measurement, the position analyzing device 300 can determine the fixed position of the mobile station 100.

In the lower tier of FIG. 4, the fixed position determination process on the mobile station 100 is achieved by measuring the reception strength of the beacon signal Sb five times, out of which four times the reception strength at access point A is higher than the reception strength at access point B. Accordingly, access point A is identified as the fixed station 200 nearest to the mobile station 100, and based on the result of the identifying, the fixed position of the mobile station 100 (in FIG. 4, fixed position "A") is determined.

For another example, it is also possible to identify the fixed station at which the average reception strength of the beacon signal Sb measured five times as described above (i.e., the fixed station nearest to the mobile station 100) and, based on the results of the measurement, determine the fixed position of the mobile station 100. A higher average reception strength of the beacon signal Sb at access point A indicates a shorter average distance dA of access point A from the mobile station 100. Likewise, a higher average reception strength of the beacon signal Sb at access point B indicates a shorter average distance dB of access point B from the mobile station 100. Accordingly when dA≤dB, it means that the mobile station 100 is present around access point A; in contrast, when dA>dB, it means that position detection system 100 is present around access point B.

In the lower tier of FIG. 4, the mobile station 100 is present inside the room where access point A is installed, and thus the comparison is expected to result in dA≤dB. In such a case, access point A is identified as the fixed station 200 nearest to the mobile station 100, and based on the result of the measurement, the fixed position of the mobile station 100 (in FIG. 4, fixed position "A") is determined.

For fixed position "A", for example, the position coordinates of the mobile station 100 can be calculated from the reception strength measured five times as described above (or the reception strength measured four times at which the reception strength at access point A is judged to be higher than the reception strength at access point B), or previously set position coordinates can be used as a position around the access point A.

As described above, when the mobile station 100 is determined to be stationary, even if the reception strength of the beacon signal Sb at each fixed station 200 varies, on the assumption that it does not result from the mobile station 100 physically moving, position information on the mobile station 100 is retained at a fixed position so that no unnecessary variation occurs in the position information on the mobile station 100.

Specifically, it is possible to avoid a situation (see the upper tier of FIG. 4) where erroneous detection occasionally occurs, like, despite the mobile station 100 being present inside the room where access point A is installed, the mobile station 100 being detected as being present inside the room where access point B is installed.

While FIG. 4 deals with, for the sake of simplicity, an example where two access points A and B are receiving the beacon signal Sb, it is possible to perform a fixed position determination process similar to that described above also in a case where three or more fixed stations 200 are receiving the beacon signal Sb. On the other hand, in a case where only one fixed station 200 is receiving the beacon signal Sb, a fixed position can be determined on the assumption that the mobile station 100 is present around that fixed station 200.

<Further Modifications>

The various technical features disclosed herein can be implemented in any manner other than specifically described by way of embodiments above, and allow for many modifications within the spirit of the technical ingenuity involved. That is, it should be understood that the embodiments herein are in every aspect illustrative and not restrictive, and that the technical scope of the present invention is defined not by the description of embodiments given above but by the scope of the appended claims and encompasses any modifications in a sense and scope equivalent to those of the claims.

INDUSTRIAL APPLICABILITY

The position detection system disclosed herein can be employed, for example, to monitor the position of a worker in an office or a factory.

REFERENCE SIGNS LIST

1 position detection system
100 mobile station (beacon)
110 controller
120 communicator
130 movement sensor
131 acceleration sensor
132 geomagnetism sensor
140 storage
200 fixed station (access point)
300 position analyzing device (server)

The invention claimed is:

1. A position detection system, comprising:
a mobile station configured to transmit a beacon signal;
a plurality of fixed stations configured to receive the beacon signal;
a position analyzing device configured to perform position estimation on the mobile station based on a reception strength of the beacon signal at each of the fixed stations, thereby to acquire position information on the mobile station,
wherein
the mobile station includes a movement sensor configured to perform quiescence determination, and
the position analyzing device is configured, while the mobile station is stationary, to suspend the position estimation on the mobile station and retain the position information at a fixed position, wherein
the position analyzing device is configured, after suspending the position estimation on the mobile station, to measure the reception strength of the beacon signal at each of the fixed stations a plurality of times, and to determine the fixed position based on results of the measurement.

2. The position detection system according to claim 1, wherein
the position analyzing device is configured to identify, among the plurality of fixed stations, a fixed station at which the reception strength of the beacon signal is highest most frequently, to determine the fixed position based on a result of the identifying.

3. The position detection system according to claim 1 wherein
the position analyzing device is configured to identify, among the plurality of fixed stations, a fixed station at which an average reception strength of the beacon signal is highest, to determine the fixed position based on a result of the identifying.

4. The position detection system according to claim 1, wherein
the movement sensor includes an acceleration sensor configured to sense acceleration.

5. The position detection system according to claim 1, wherein
the movement sensor includes a geomagnetism sensor configured to sense geomagnetism.

6. The position detection system according to claim 4, wherein
the mobile station is configured to derive regularly a number of steps of a person carrying the mobile station based on a sensing signal obtained from the acceleration sensor, to perform the quiescence determination based on how the number of steps is updated.

7. The position detection system according to claim 4, wherein
the mobile station is configured to perform the quiescence determination by using at least one of a raw value, an average value, and a variance value of a sensing signal obtained from the movement sensor.

8. The position detection system according to claim 4, wherein
the mobile station is configured to perform frequency analysis on a sensing signal obtained from the acceleration sensor, to perform the quiescence determination based on a result of the analysis.

9. The position detection system according to claim 1, wherein
the mobile station transmits, along with the beacon signal, a result of the quiescence determination.

10. The position detection system according to claim 1, wherein
the plurality of fixed stations are installed at different places indoors.

11. A position analyzing device configured to build a position detection system with a mobile station and a plurality of fixed stations,
wherein the position analyzing device is configured to receive a result of quiescence determination transmitted from the mobile station together with a beacon signal and configured,
when the mobile station is not stationary, to perform position estimation on the mobile station based on a reception strength of the beacon signal at the plurality of fixed stations to acquire position information on the mobile station and,
when the mobile station is stationary, to suspend the position estimation on the mobile station and retain the position information at a fixed position, and wherein the position analyzing device is configured, after suspending the position estimation on the mobile station, to measure the reception strength of the beacon signal at each of the fixed stations a plurality of times, and to determine the fixed position based on results of the measurement.

12. A position detection system, comprising:
a mobile station configured to transmit a beacon signal;
a plurality of fixed stations configured to receive the beacon signal;
a position analyzing device configured to perform position estimation on the mobile station based on a reception strength of the beacon signal at each of the fixed stations, thereby to acquire position information on the mobile station,
wherein:
the mobile station includes a movement sensor configured to perform quiescence determination, and
the position analyzing device is configured, while the mobile station is stationary, to suspend the position estimation on the mobile station and retain the position information at a fixed position, wherein
the movement sensor includes an acceleration sensor configured to sense acceleration, and
the mobile station is configured to perform frequency analysis on a sensing signal obtained from the acceleration sensor, to perform the quiescence determination based on a result of the analysis.

* * * * *